(12) United States Patent
Altman

(10) Patent No.: US 9,379,896 B1
(45) Date of Patent: Jun. 28, 2016

(54) COMPROMISED PASSWORD MITIGATION

(75) Inventor: Alon Altman, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 845 days.

(21) Appl. No.: 13/279,528

(22) Filed: Oct. 24, 2011

(51) Int. Cl.
*H04L 29/06* (2006.01)
*H04L 9/32* (2006.01)
*G06F 21/46* (2013.01)

(52) U.S. Cl.
CPC ............. *H04L 9/3236* (2013.01); *G06F 21/46* (2013.01)

(58) Field of Classification Search
CPC ....... G06F 21/305; G06F 21/45; G06F 21/46; H04L 9/321; H04L 63/0892; H04L 9/088; H04L 9/3236; H04L 9/3239; H04L 9/3242
USPC .......................................................... 713/183
See application file for complete search history.

(56) References Cited

U.S. PATENT DOCUMENTS

| | | | |
|---|---|---|---|
| 8,375,425 B2* | 2/2013 | Keohane et al. | 726/6 |
| 2002/0083325 A1* | 6/2002 | Mediratta et al. | 713/182 |
| 2010/0299729 A1* | 11/2010 | Wallace | G06F 21/33 726/5 |
| 2011/0093709 A1* | 4/2011 | Lunt et al. | 713/168 |

* cited by examiner

*Primary Examiner* — Jeffrey D Popham
(74) *Attorney, Agent, or Firm* — Patent Law Works LLP

(57) ABSTRACT

The compromised password mitigation module comprises a compromised password collection module, compromised password storing module, a logging module, account protection module and user database. The compromised password collection module receives or gathers sets login names, compromised password hashes and hash functions. The compromised password collection module provides this gathered information to the compromised password storing module. The compromised password storing module stores this information in user records in the user database. The compromised password hashes and hash functions are advantageously stored along with the actual password hash. The logging module uses the user records when evaluating access to determine whether a submitted password matches both a compromised password hash and an actual password hash. If a match is found, access to the system is denied and additional protective action is taken by decal protection module. If no match is found, the user is allowed to access the system.

25 Claims, 5 Drawing Sheets

COMPROMISED PASSWORD MITIGATION

BACKGROUND

The present disclosure relates to security for online systems and services. In particular, the present disclosure relates to systems and methods for compromised password mitigation for online systems. Still more particularly, the present disclosure relates to a system and method for compromised hashed password mitigation at login time for online systems.

The popularity and use of the Internet, web browsers, social networks and other types of electronic communication has grown dramatically in recent years. In particular, there are number of online systems or services such as social networks, email, micro blogging, new feeds, and various other third party web sites. While these systems were once limited to sending messages, the systems can now be used to post messages, post photos or videos, micro blog, retrieve news content, retrieve web content and obtain presence information. As a prerequisite to accessing such systems, they typically require that the user provide a user name or login and password before access is granted.

The online services also use usernames and passwords for identifying their users. These passwords are often stored in an encrypted (hashed) form in their databases. Sometimes, these databases get compromised by external attackers and leaked publicly. Even if the original service provider invalidates the leaked accounts, many users share usernames and passwords among different websites or services. Such shared passwords allow malicious attackers to use stolen passwords on other sites, if they can reverse the hashes.

Owners of other sites cannot easily mitigate such attacks because they store their users' passwords using different hashing algorithms or using a unique salt. In order to mitigate such attacks, owners of other sites may either attempt to reverse the hashes, which is computationally intensive and not guaranteed to work, or disable all leaked accounts without knowing if the passwords have been reused, causing a bad experience for the users.

In some cases, owners of sites may also store their passwords in plain text, but in these cases they may be subject to severe compromise of their database.

SUMMARY

In one innovative aspect, a system for compromised password mitigation includes a compromised password mitigation module. The compromised password mitigation module comprises a compromised password collection module, compromised password storing module, a logging module, account protection module and user database. The compromised password collection module receives or gathers sets login names, compromised password hashes and hash functions. The compromised password collection module provides this gathered information to the compromised password storing module. The compromised password storing module stores this information in user records in the user database. The compromised password hashes and hash functions are advantageously stored along with the actual password hash. The logging module uses the user records when evaluating access to determine whether a submitted password matches both a compromised password hash and an actual password hash. If a match is found, access to the system is denied and additional protective action is taken by decal protection module. If no match is found, the user is allowed to access the system. The present disclosure also includes a method for processing access requests using the compromised password mitigation, and a method for storing compromised login information into the user database.

The present disclosure is particularly advantageous in a number of respects. First, the comparison of the compromised passwords at login time is computationally very efficient and does not have a material impact on the length of the login time. Second, the comparison of the compromised passwords at login time minimizes the number of false positives generated thereby producing the number of users that are forced through secondary authentication. Third, comparison of compromised passwords at login time is performed in a manner in which the actual password does not need to be stored permanently and instead uses a hash of the actual password and compromised password.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
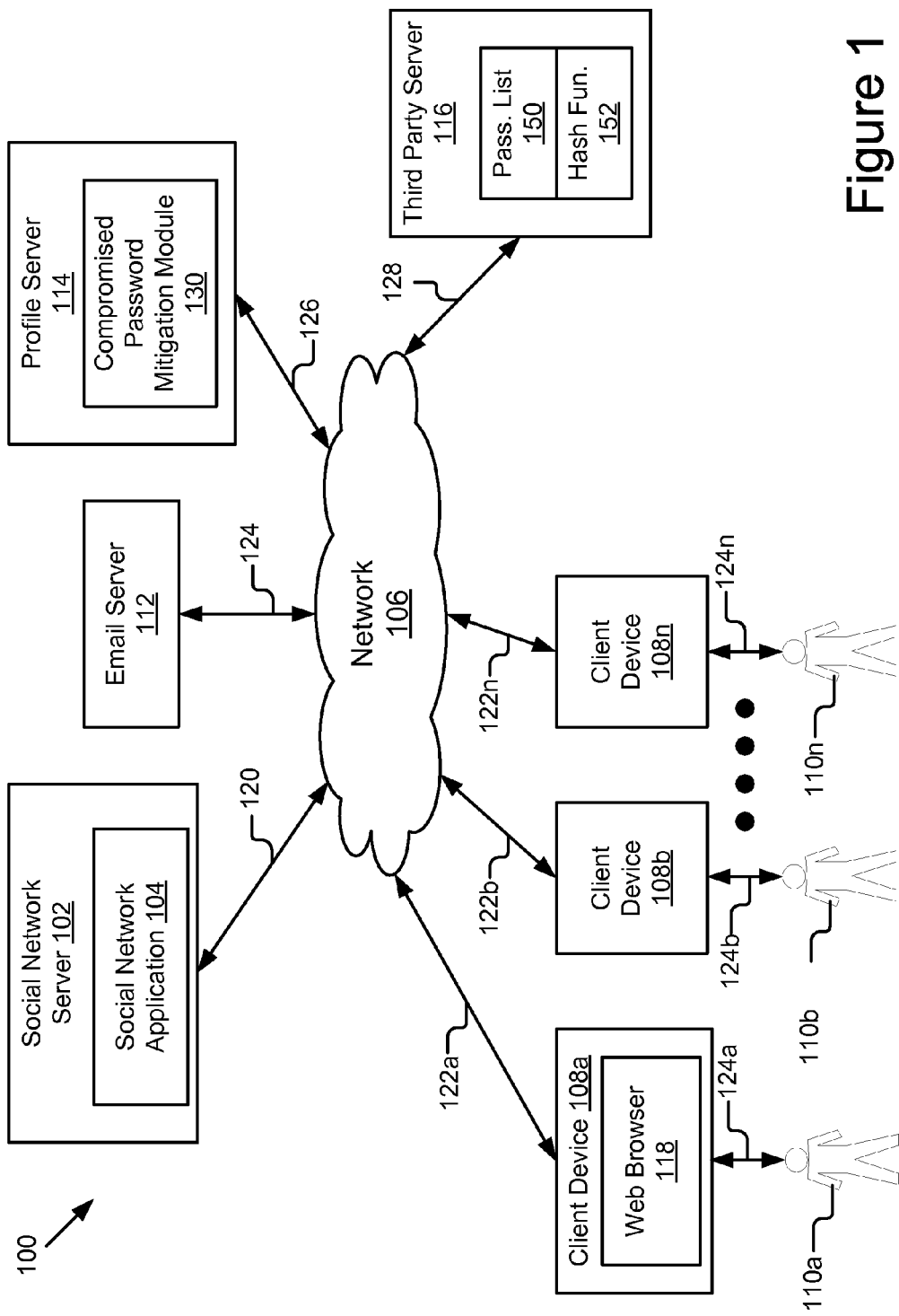
FIG. 1 is a block diagram illustrating an embodiment of a compromised password mitigation system for online systems.

FIG. 1 illustrates a block diagram of one embodiment of a system 100 for compromised password mitigation. The illustrated system 100 for compromised password mitigation includes a social network server 102 having a social network application 104, a network 106, one or more client devices 108a-108n that are accessed by users 110a-110n, an email server 112, a profile server 114 having a compromised password mitigation module 130 and a third party server 116. In the illustrated embodiment, these entities are communicatively coupled via the network 106. Moreover, while the present disclosure is described below primarily in the context of access to the social network server 102, the email server 112, and the third party server 116, the present disclosure is applicable to access to an SMS/MMS sever, a micro blogging server and a IM server or any other online system.

The client devices 108a-108n in FIG. 1 are used merely by way of example. For example, the client devices 108a-108n may be a personal computer, a laptop computer, a tablet computer or a smart phone. Moreover, the client devices 108a-108n may include a web browser 118 for interacting with the social network server 102, the email server 112, the profile server 114 and the third party server 116. While FIG. 1 illustrates three client devices 108a-108n, the present disclosure applies to any system architecture having one or more client devices client devices 108a-108n. Furthermore, while only one network 106 is coupled to the social network server 102, the client devices 108a-108n, the email server 112, the profile server 114 and the third party server 116, in practice any number of networks 106 can be connected to the entities. Furthermore, while only one third party server 116 is shown, the system 100 could include one or more third party servers 116 or other online systems.

While shown as stand-alone server in FIG. 1, in other embodiments all or part of the social network server 102 could be part of the third party server 116 that is connected to the network 106. The social network server 102 interacts via signal line 120 and the network 106 with the client devices 108-108n, the email server 112, the profile server 114, and the third party server 116. The social network server 102 includes the social network application 104. The social network server 102 cooperates with the client device 108 to generate and present user interfaces that present social network content to the user 110. The social network server 102 also collects data from these other system and components to determine information about a user's context and state. The social network server 102 is coupled for communication with the client devices 108-108n, which are connected to the network 106 via signal lines 122a-122n, respectively. The user 110a interacts with the client device 108a as represented by the signal lines 124a. Similarly, the client device 108n is coupled to the network 106 via signal line 122n and the user 110n interacts with the client device 108n as represented by a signal line 124n. It should be understood that the social network server 102 can be stored in any combination of the devices and servers, or in only one of the devices or servers. A social graph, SMS/MMS sever, micro blogging server and the IM server (not shown) may also be coupled to the network 106 for communication with the social network server 102. In some embodiments, the social network server 102 receives web search history and information from the search server (not shown) and other signals from an email server 112 that can be used in addition to the present disclosure to determine a content stream for a user.

In one embodiment, the social network server 102, the email server 112, the profile server 114 and the third party server 116 are hardware servers including a processor, memory, and network communication capabilities.

The social network server 102 as noted above includes a social network application or software 104. Although only one social network server 102 is shown, it should be understood that multiple servers may be present. A social network is any type of social structure where the users are connected by a common feature. The common feature includes friendship, family, work, an interest, etc. The common features are provided by one or more social networking systems, such as those included in the system 100, including explicitly-defined relationships and relationships implied by social connections with other online users, where the relationships form a social graph. In some examples, the social graph can reflect a mapping of these users and how they are related. Furthermore, it should be understood that social network server 102 and social network application 104 are representative of one social network and that there are multiple social networks coupled to the network 106, each having its own server, application and social graph. For example, a first social network is more directed to business networking, a second more directed to or centered on academics, a third is more directed to local business, a fourth directed to dating and others of general interest or a specific focus.

The network 106 is a conventional type, wired or wireless, and may have any number of configurations such as a star configuration, token ring configuration or other configurations. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The email server 112 is coupled to the network 106 by signal line 124 for communication with the other components of the system 100. The e-mail server 112 is a computer for processing e-mail including a post office, storage and may implement the message handling protocols, for example, Simple Mail Transfer Protocol (SMTP).

The third party server 116 is representative of any server that provides online services. The third party server 116 is a computer and software to serve the requests of other programs, e.g., clients. The third party server 116 is coupled for communication with the other components of the system 100 via a network 106 and signal line 128. In some embodiments, the third party server 116 is a standalone system not coupled to the network 106. In such cases, the encrypted password list 150 (that may be compromised) for authorized users and cryptographic hash function 152 used to encrypt the passwords may be manually transferred from the third party server 116 to the compromised password mitigation module 130 using a USB drive, CD-ROM, other media or transfer mechanism. Even though only a single third party server 116 is shown in FIG. 1, it should be understood that the system 100 may include hundreds or even thousands of third party servers 116. The third party servers 116 may offer any type of online service including sale of goods, sale of services, gaming, blogging, messaging, etc. For example, the system and methods may be used by any provider with a password-based authentication system including web services, banks, corporate login systems, network logins, and more. In some embodiments, the third party servers 116 communicate with the client devices 108 running the web browser 118. In order to access the online services provided by the third party server 116, authentication of the user is typically required. The third party server 116 may use its own authentication or rely upon the profile server 114 for authentication. For authentication purposes, the third party server 116 stores user information including a login name, an encrypted password and a cryptographic hash function. For example, third party server 116 is shown as including the encrypted password list 150 for authorized users and cryptographic hash function 152 used to encrypt the passwords. This information is used by the third party server 116 to confirm a particular user is authorized to gain access to the online system operable on the third party server 116. For example, the user provides a login name and a password. The provided password is encrypted using the cryptographic hash function and the result is compared to the value stored for that user in the encrypted password list 150. If the values match, the user is given access to the online system. If the value does not match, the user is denied access to the online system. In some embodiments, the compromised password mitigation module 130 or an instance of it is operational and part of the third party server 116.

The profile server 114 is coupled by signal line 126 to the network 106 for communication and cooperation with the other components of the system 100. The profile server 114 includes the compromised password mitigation module 130 as will be described in more detail below with reference to FIG. 2. The profile server 114 interacts with other systems 102, 108a-108n, 112 and 116 to retrieve/receive a login request and allow or deny access to these other systems 102, 112 and 116. The profile server 114 also receives and stores user profile information including user name, password, hint, secret question, etc. In some embodiments, the profile server 114 receives and sends information from the other systems 102, 108a-108n, 112 and 116 that allow the user 110a-110n to access the functionality of those systems 102, 108a-108n, 112 and 116. The profile server 114 detects suspicious login requests as will be described below with reference to the compromised password mitigation module 130, and compares them to the attributes of the user records. If the attributes of a login request do not match the user records, then that login request is granted access to the system without further authentication challenge. If the attributes of a login request do not match the user records, then that login request may require further authentication, verification or challenges. In one embodiment, the profile server 114 cooperates with the social network server 102 to control access to the social network 104. In another embodiment, the profile server 114 also cooperates with the email server 112 to control access to the e-mail server 112. In another embodiment, the profile server 114 cooperates with the third party server 116 to control access to the online services offered by the third party server 116. In yet other embodiments, the profile server 114 can cooperates with other systems (not shown) such as a Short Message Service (SMS)/Multimedia Messaging Service (MMS) server, an instant messaging (IM) server, a document server, a blogging server, a new feed server, or any other the third party server to control access to those systems.

In some embodiments, the compromised password mitigation module 130 is incorporated into a standalone system. In such embodiments, the compromised password mitigation module 130 performs the operations of the present disclosure for the system into which it is incorporated. For example, the compromised password mitigation module 130 can be incorporated into systems such a safe deposit box system, an ignition system of an automobile, etc. In such standalone systems, the compromised passwords may be retrieved from another system and manually transferred using a USB drive, CD-ROM or other media.

While FIG. 1 shows the compromised password mitigation module 130 as being part of and operating upon the profile server 114, it should be understood that the compromised password mitigation module 130 can be part of or operable on other components of the system 100. For example, in some embodiments, the compromised password mitigation module 130 can be part of or operable on social network server 102, one of the client devices 108a-108n, the email server 112 or the third party server 116. It should be recognize that the compromised password mitigation module 130 can be part of, operable or on stored in any combination on the devices and servers.

Profile Server 114

Figure 2:
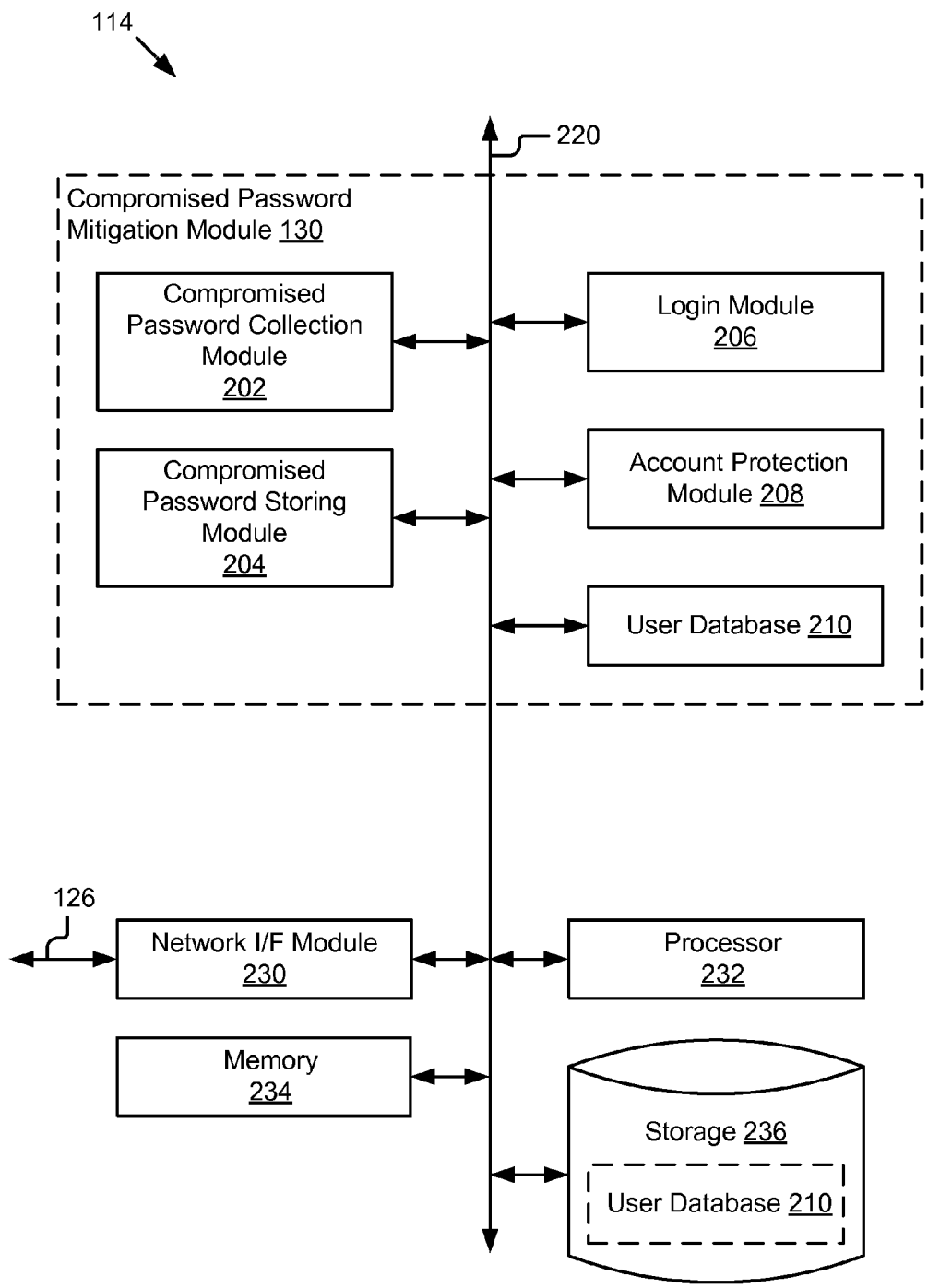
FIG. 2 is a block diagram illustrating a profile server for compromised password mitigation according to some embodiments of the present disclosure.

FIG. 2 is a block diagram of one embodiment of the profile server 114. In some embodiments, the profile server 114 comprises: a network interface (I/F) module 230, a processor 232, a memory 234, storage 236 and the compromised password mitigation module 130.

The network interface module 230 is coupled to network 106 by signal line 126 and coupled to the bus 220. The network interface module 230 includes ports for wired connectivity such as but not limited to USB, SD, or CAT-5, etc. The network interface module 230 links the processor 232 to the network 106 that may in turn be coupled to other processing systems. The network interface module 230 provides other connections to the network 106 using standard network protocols such as TCP/IP, HTTP, HTTPS and SMTP. In other embodiments, the network interface module 230 includes a transceiver for sending and receiving signals using Wi-Fi, Bluetooth® or cellular communications for wireless communication.

The processor 232 comprises an arithmetic logic unit, a microprocessor, a general-purpose controller or some other processor array to perform computations and provide electronic display signals to a display device. The processor 232 is coupled to the bus 220 for communication with the other components. Processor 232 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. Other processors, operating systems, sensors, displays and physical configurations are possible.

The memory 234 stores instructions and/or data that may be executed by processor 232. The memory 234 is coupled to the bus 220 for communication with the other components. The instructions and/or data may comprise code for performing any and/or all of the techniques described herein. The memory 234 may be a dynamic random access memory (DRAM) device, a static random access memory (SRAM) device, flash memory or some other memory device.

In one embodiment, the storage 236 stores data, information and instructions used by the profile server 114. Such stored information includes information about users, messages, posts, photos, and other information. In some embodiments, the storage 236 includes a user database 210 having user records for compromised password mitigation as will be described in more detail below with reference to FIG. 3. The storage 236 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. The data storage 236 is coupled by the bus 220 for communication with other components 202, 204, 206, 208, 230, 232 and 234 of the profile server 114.

Compromised Password Mitigation Module 130

Still referring to FIG. 2, the compromised password mitigation module 130 is shown in greater detail. The compromised password mitigation module 130 includes a compromised password collection module 202, a compromised password storing module 204, a login module 206, an account protection module 208 and a user database 210. One function of the compromised password mitigation module 130 is to provide a double check to ensure that attackers or unauthorized users are not using compromised passwords to gain access to the system 100 or any online services offered by third party servers 116. These components 202, 204, 206 and 208 are coupled to the bus 220 for communication with each other and the other components 230, 232, 234 and 236 of the profile server 114. The bus 220 can be any type of conventional communication bus. The operation of these modules 202, 204, 206 and 208 will be described in more detail below with reference to FIGS. 3-5B.

The compromised password collection module 202 is software, code or routines for gathering information about user names and passwords that have been compromised. In some embodiments, the compromised password information is provided by security systems of the third party server 116 or other stakeholders. This information is provided to the compromised password collection module 202 by these systems such via network 106. In other embodiments, the compromised password information is retrieved by the compromised password collection module 202 from the World Wide Web or other networks. There are number of sites used by hackers and others to publish password lists and login information. In such embodiments, the compromised password collection module 202 utilizes web crawlers or bots to retrieve the compromised password information. The compromised password collection module 202 may also be coupled to other sources of information such as in the black hat/hacker community to receive compromised password information. The compromised password collection module 202 is coupled by the bus 220 for communication with the other components (e.g., the compromised password storing module 204) of the profile server 114 and is also coupled to the network 106 by the network interface module 234 for communication with the web, the third party server 116, other stakeholders and the black hat/hacker community.

The compromised password storing module 204 is software, code or routines for storing compromised usernames and passwords in the user database 210. The compromised password storing module 204 is coupled to receive compromised password information from the compromised password collection module 202. The compromised password storing module 204 processes this information and stores it in the user database 210. In particular, the compromised password storing module 204 stores compromised password information in the user records alongside the actual user password. The operation of the compromised password storing module 204 will be described in more detail below with reference to FIGS. 3 and 5. The compromised password storing module 204 is coupled to store information to and retrieve information from the user database 210. In embodiments where the user database 210 is part of the storage 236, the compromised password storing module 204 is coupled for communication with the data storage 236.

The login module 206 is software and routines for processing login requests and granting user access to the social network server 102, the e-mail server 112, the profile server 114 or the third party server 116. Those skilled in the art will appreciate that these systems 102, 112, 114 and 116 are merely used by way of example. The login module 206 may be used to control access to fewer or more as well as different systems than those described with reference to FIG. 1. The operation of the login module 206 will be described below in more detail with reference to FIG. 4. The login module 206 is particularly advantageous because it performs an additional comparison of a login request to compromised passwords allowing the user to gain access to the system. The login module 206 advantageously prompts for user challenges when the password may have been compromised, but does not unnecessarily increase the number of false positive challenges. The login module 206 is coupled to bus 220 to receive login requests from other systems 102, 112, 114 and 116. The login module 206 is also coupled to the user database 210 to retrieve login credentials associated with the user name. Finally, the login module 206 is coupled by bus 220 to the account protection module 208 signal when access to an account is possibly fraudulent and additional protective measures need to be taken.

The account protection module 208 is software and routines for protecting an account when the login module 206 has detected unauthorized or potentially fraudulent use of a user name and password. The account protection module is 208 is coupled by the bus 220 to receive a signal from the login module 206 indicating possible unauthorized use of a user name and password. The account protection module 208 implements various actions to secure the user's account. These actions include but are not limited to: disabling the account, denying access to the account, requiring secondary authentication before account access is granted, forcing password reset, adding an entry to a lot of log, sending the notification to a supervisor, disabling particular features, etc. The account protection module 208 is coupled to other systems to implement such account protection measures. For example, the account protection module 208 may be coupled to a challenge system, a secondary authentication system, or an administrative control system.

Figure 3:
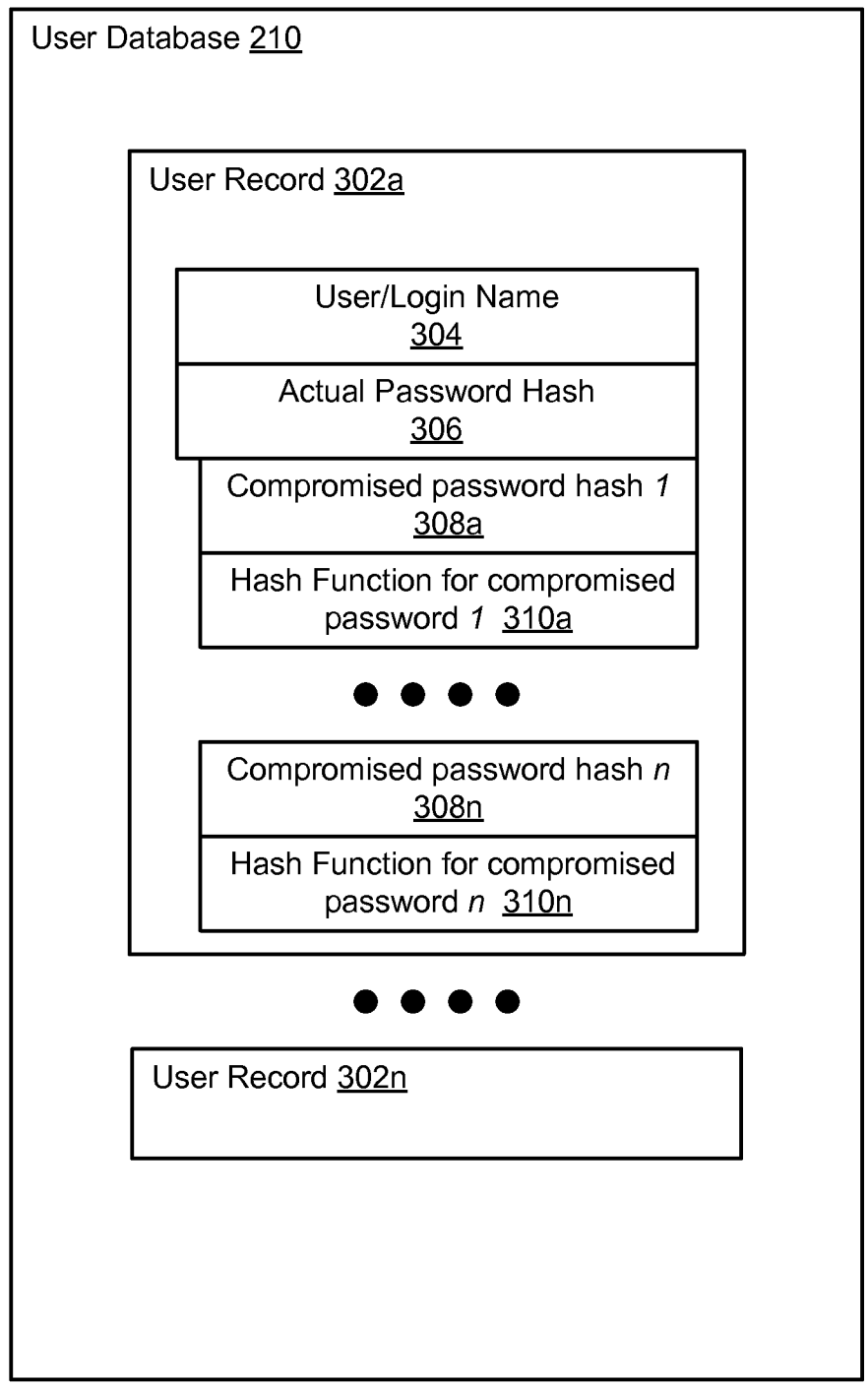
FIG. 3 is a block diagram showing a memory structure for compromised password mitigation according to some embodiments of the present disclosure.

The user database 210 is a data storage system for storing usernames or login names and passwords. Referring now also to FIG. 3, the user database 210 is described in more detail. As has been noted above, the compromised password mitigation module 130 advantageously stores information about compromised passwords in the user database 210. The compromised password mitigation module 130 stores a hash of the compromised password as well as the user name and hash of the actual password into user records 302. One embodiment for the user database 210 is shown in FIG. 3. The user database 210 includes a plurality of user records 302a to 302n. The database 210 may include any number of user records 302. Furthermore, the database 210 can be divided into any number of smaller databases interconnected and adapted for communication with each other. It should be appreciated that for every unique login name there is a corresponding user record 302. FIG. 3 shows one user record 302a with additional detail. Each user record 320 includes a field for storing a user or login name 304 and a second field for storing an actual password hash 306 corresponding to the user name. The user record 302 may also include one or more pairs of fields for storing a compromised password hash 308 and its corresponding hash function 310. As illustrated by FIG. 3, the user record 302 may include any number of pairs of fields for storing compromised password hashes 308 and their corresponding hash functions 310. The compromised password hash 308 field stores a hash of a potentially compromised password. The field for the hash function 310 for the compromised password stores an identifier, a link, the actual hash function or some other information that can be used to retrieve the hash function that was used to encrypt the potentially compromised password that is stored in the corresponding compromised password hash 308 field. The user record 302 is utilized by the login module 206 for determining whether a user should be granted access to the system. The compromised password storing module 204 stores received information in the user database 210 according to this format. It should be recognized that a given user record 302 need not have a compromised password hash field 308 and compromised hash function 310 if there are no instances when the user's password has been compromised. By the same token, a given user record may have many compromised password hash field 308 and corresponding compromised hash functions 310 if the user login is used on numerous other systems that have been compromised.

In some embodiments, the compromised hashed passwords need not be stored in the user database 210, but may be stored in any other form accessible at log in time. These password entries need not be deleted when it becomes apparent that the compromised passwords does not match the real password, and may be retained indefinitely. In other embodiments, the compromised password hash 308 and compromised hash function 310 are deleted when it becomes apparent that the compromised passwords does not match the real password.

One or more of the compromised password collection module 202, the compromised password storing module 204, the login module 206, and the account protection module 208 are executable on the processor 232; store data that, when executed by the processor 232, causes the modules to perform the operations described herein; are instructions executable by the processor 232 to provide the functionality described herein; or are stored in the memory 234 of the profile server 114 and are accessible and executable by the processor 232.

Methods

Figure 4:
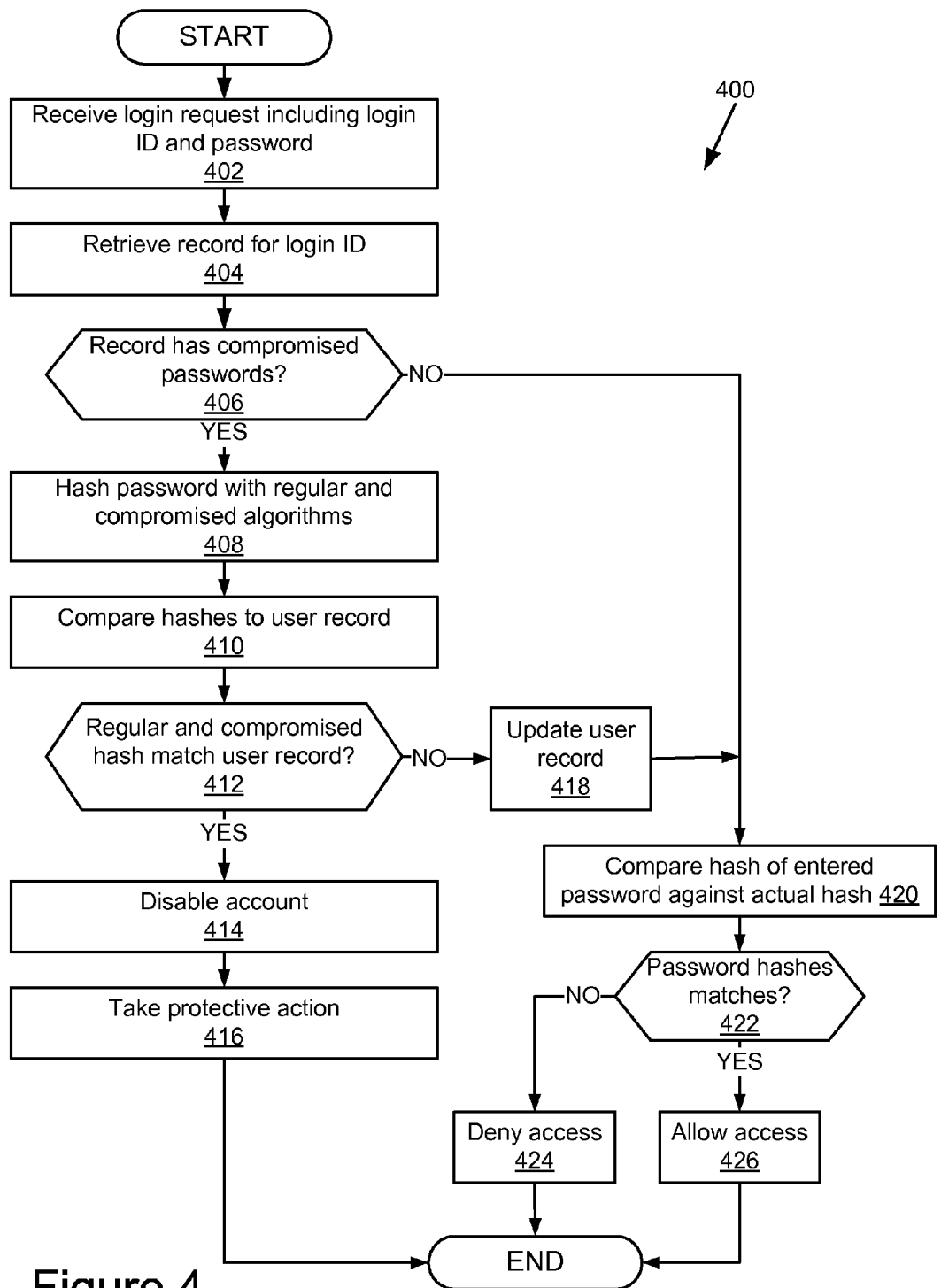
FIG. 4 is a flowchart of a method for processing access requests using the compromised password mitigation system according to some embodiments of the present disclosure.

Referring now to FIG. 4, one embodiment of a method 400 for processing access requests in accordance with the present disclosure will be described. In some embodiments, the step of the method 400 are performed at login. The method 400 begins by receiving 402 a login request including a login identifier (ID) and a password. At this point the received password is in plain text and unencrypted. The received password may have been encrypted for transport and then decrypted by the profile server 114 so are likewise not hashed. Then the method 400 retrieves 404 a record corresponding to the received login ID. For example, the login module 206 uses the received login ID to search the user database 210 and retrieve the user record 302 that has a value in the login name field 304 that matches the received login ID of the login request. Next, the method 400 determines 406 whether the record 302 retrieved includes a compromised password. This can be done quite easily by checking whether the retrieved user record 302 has any nonempty compromised password fields.

If the method 400 determined that the retrieved user record 302 did include compromised passwords, the method 400 continues by generating 408 one or more hashed passwords using the hash functions stored in the user record 302. The method 400 generates an actual password hash using the default hash function of the profile server 114. The method 400 also generates one or more compromised password hashes using the hash functions stored in the user record 302. In other words, the plain text received password is hashed under both hash algorithms—the regular one used for hashing the user's password and the hash function(s) for the compromised password(s) stored in the user record 302. For example, if there were two compromised passwords stored for the retrieved user record 302, the method 400 calculates a generated actual password hash using the hash function of the profile server 114, a first generated compromised password hash using the hash function for the first compromised password 1, and a second generated compromised password hash using the hash function for the second compromised password 2. Thus for each compromised password hash in the user record 302, this step 408 generates a corresponding generated compromised password hash that will be used for comparison. Next, the method 400 compares 410 the generated password hashes to the stored password hashes (e.g., the values stored in field 308) in the user record 302 to determine if there is a match. For example, the login module 206 performs the generation and comparison. Then the method 400 determines 412 whether the actual password and one or more compromised hashes match. Only if both the generated actual password hash and the stored actual password hash are the same and at least one of the generated compromised hashes and its corresponding stored compromised hash are the same is considered to be a match. In other words, if the generated actual password hash and the stored actual password hash are not the same, there is not a match. Similarly, if none of the generated compromised hashes are the same as their corresponding stored compromised hash there is not a match.

If there is not a match (neither hashes match, the actual password hash does not match or none of the compromised password hashes match), the method 400 continues by updating 418 the user record 302 by removing the compromised password hash(es) and compromised hash function(s). More specifically, only the compromised hashes and passwords that match the entered password are removed. In some embodiments, even if hashes are removed from a particular user record 302, the passwords (hashed with the default hash function) may be added to a list of forbidden passwords for the account. In still other embodiments, this step 418 is omitted and the compromised password hash(es) and compromised hash function(s) are keep as part of the user record 302 for some predetermined amount of time. After step 418, the method 400 continues in step 420 as will be described below. On the other hand, if in step 412 the method determined that there was a match, the account is now known to be compromised and is disabled 414. The method 400 then takes 416 protective action. The protective action is taken by the protective action module 208 and can be any one of the protective steps discussed above. For example, the user may be required to satisfy challenges, perform secondary authentication or perform other authentication steps before access is permitted. Other examples include resetting the password for the account, temporarily disabling the account or permanently disabling the account. After step 416, the method 400 ends.

If the method 400 determined that the retrieved user record 302 did not include any compromised passwords in step 406 or after step 418, the method 400 continues by calculating the hash of the entered password and comparing 420 it against the actual hash stored in the actual password hash field 306 from the user record 302. Then the method 400 determines 422 whether the password hashes match. If the password hashes do not match, the method 400 continues to deny access and the method 400 ends. On the other hand, if the password hashes do match, the method 400 allows 426 the user to access the system and ends. It should be understood that in some embodiments, after step 422, the method 400 may impose additional challenges on the user for other reasons, for example user is at a suspicious location, before allowing 426 the user to gain access.

In some embodiments, other actions or comparisons may be performed. For example, if the login request included a non-matching compromised password, the IP address used to provide the login request can be logged or added to a blacklist as it is likely that that address is the IP address of a possible attacker. These and other modifications to the system and method described above are within the scope of the present disclosure.

Figure 5:
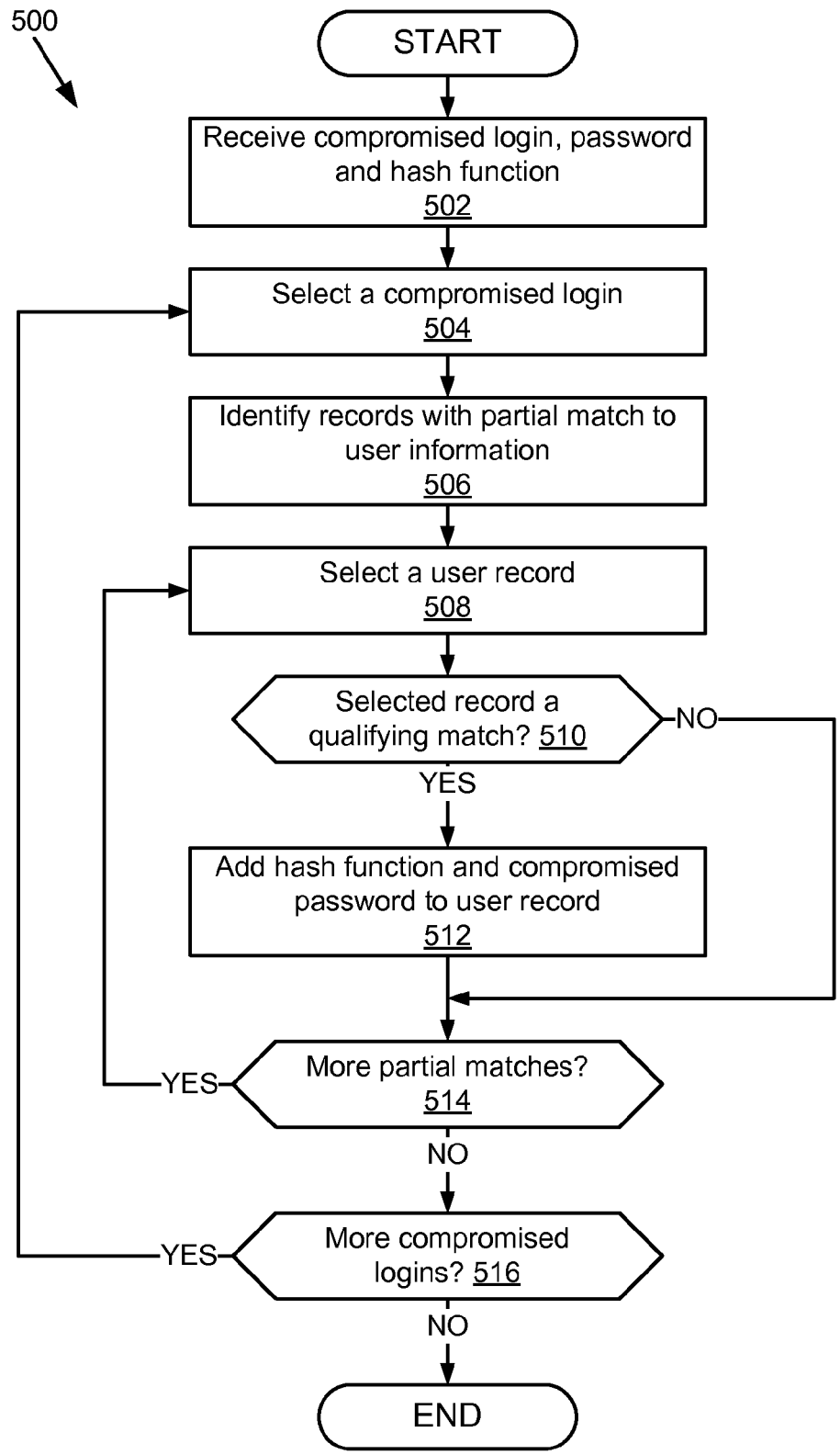
FIG. 5 is a flowchart of a method for updating the memory structure for compromised password mitigation according to some embodiments of the present disclosure.

Referring now to FIG. 5, an embodiment of a method 500 for storing compromised password hashes in the user database 210 will be described. The method 500 begins by receiving 502 a compromised login, a password or hash of the password and a hash function. In some embodiments, numbers of compromised login our batch processed. The present disclosure advantageously stores any compromised password hash alongside the actual hash for the login. Thus, the method 500 must first determine the login so that the corresponding user records 302 can be identified. The method 500 continues by selecting 504 the login name for a compromised login. Next, the method 500 identifies 506 user record 302 that are a match or partial match to the compromised login name. For example, if the username or login name for the compromised login is "jsmith," the compromised password storing module 204 generates strings for searching if the user login name 304 of the database 210. The strings are generated assuming that the compromised user login has all or some of the same characters as the login that the user adopted for other systems. The compromised login "jsmith" generates strings such as jsmith@gmail.com, jsmith@yahoo.com, jsmith@aol.com, jonsmith, johnsmith, joesmith. jaredsmith, smithj, etc. In some embodiments, the compromised login is parsed for first name, last name, domain name this, etc. and variances on these categories are used possible usernames which are in turn used to search the user database 210. The method 500 identifies 506 All the records in the user database 210 that are possible matches to the compromised login. The method 500 continues by selecting 508 the user record. The selected record is then evaluated to determine 510 whether it qualifies as a possible match to the compromised login. The selected record qualifies as a possible match to the compromised login if an account exists on the system with the specified name. If the selected record does not qualify as a match, the method 500 continues directly to step 514. However, if the selected record does qualify as a match, the method 500 adds 512 the hash function and hash of the compromised password received in step 502 to the user record 302. For example, a compromised password hash field 308 and a hash function field 310 are added to the user record 302 and the values received in step 502 are stored therein. The method 500 continues by determining 514 whether there are additional partial matches from the identification step 506. If so, the method continues to repeat steps 508, 510, 512 and 514 for each partial match. Once there are no more identified partial matches, the method 500 determines 516 whether there are any additional compromised logins. If so, the method returns to step 504 to select another login. The method 500 repeats steps 504, 506, 508, 510, 512, 514 and 516 for the next login. On the other hand, if there are no more additional logins the method 500 ends.

Systems and methods for compromised password mitigation have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in one embodiment below with reference to user interfaces and particular hardware. Moreover, the technologies are disclosed above primarily in the context of a social network server; however, the disclosed technologies apply to other data sources and other data types (e.g., collections of other resources such as images, audio, web pages) that detect and extend user engagement with content.

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In one embodiment, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present invention can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method for compromised password mitigation system, the method comprising:
    receiving, at a login time, a login request including a login identifier and a password;
    retrieving a retrieved actual password hash and a retrieved compromised password hash corresponding to the login identifier, the retrieved compromised password hash is a hash of a potentially compromised password;
    retrieving an actual password hash function and a compromised password hash function;
    generating a generated actual password hash by applying the actual password hash function to the password and a generated compromised password hash by applying the compromised password hash function to the password, the generated actual password hash being different from the generated compromised password hash;
    comparing, at the login time and responsive to the login request, the retrieved actual password hash to the generated actual password hash;
    comparing, at the login time and responsive to the login request, the retrieved compromised hash to the generated compromised password hash;
    denying access if both the retrieved actual password hash matches the generated actual password hash and the retrieved compromised hash matches the generated compromised password hash; and
    granting access if the retrieved actual password hash matches the generated actual password hash and the retrieved compromised hash does not match the generated compromised password hash.

2. The method of claim 1, comprising disabling a user account corresponding to the login identifier if both the retrieved actual password hash matches the generated actual password hash and the retrieved compromised hash matches the generated compromised password hash.

3. The method of claim 1, comprising taking protective action if both the retrieved actual password hash matches the generated actual password hash and the retrieved compromised hash matches the generated compromised password hash.

4. The method of claim 3, wherein the protective action is performing one from the group of a user challenge, a secondary authentication and other authentication steps.

5. The method of claim 3, wherein the protective action is one from the group of resetting a password for a user account, temporarily disabling the user account and permanently disabling the user account.

6. The method of claim 1, comprising updating a user record corresponding to the login identifier.

7. The method of claim 6, wherein updating the user record includes removing a compromised password hash field and a hash function field.

8. The method of claim 1, wherein generating the actual password hash and the compromised password hash comprises:
    generating a hash value as the actual password hash using the password and a hash function for a profile server; and
    generating a hash value as the compromised password hash using the password and a compromised hash function from a user record, the compromised hash function for generating the compromised password hash being retrieved from a third party.

9. A computer program product comprising a non-transitory computer usable medium including a computer readable program, wherein the computer readable program when executed on a computer causes the computer to:
    receive, at a login time, a login request including a login identifier and a password;
    retrieve a retrieved actual password hash and a retrieved compromised password hash corresponding to the login identifier, the retrieved compromised password hash is a hash of a potentially compromised password;
    retrieve an actual password hash function and a compromised password hash function;
    generate a generated actual password hash by applying the actual password hash function to the password and a generated compromised password hash by applying the compromised password hash function to the password, the generated actual password hash being different from the generated compromised password hash;
    compare, at the login time and responsive to the login request, the retrieved actual password hash to the generated actual password hash;
    compare, at the login time and responsive to the login request, the retrieved compromised hash to the generated compromised password hash;
    deny access if both the retrieved actual password hash matches the generated actual password hash and the retrieved compromised hash matches the generated compromised password hash; and
    grant access if the retrieved actual password hash matches the generated actual password hash and the retrieved compromised hash does not match the generated compromised password hash.

10. The computer program product of claim 9, wherein the computer readable program when executed on the computer causes the computer to also disable a user account corresponding to the login identifier if both the retrieved actual password hash matches the generated actual password hash and the retrieved compromised hash matches the generated compromised password hash.

11. The computer program product of claim 9, wherein the computer readable program when executed on the computer causes the computer to also take protective action if both the retrieved actual password hash matches the generated actual password hash and the retrieved compromised hash matches the generated compromised password hash.

12. The computer program product of claim 11, wherein the protective action is performing one from the group of a user challenge, a secondary authentication and other authentication steps.

13. The computer program product of claim 11, the protective action is one from the group of resetting a password for a user account, temporarily disabling the user account and permanently disabling the user account.

14. The computer program product of claim 9, wherein the computer readable program when executed on the computer causes the computer to also update a user record corresponding to the login identifier.

15. The computer program product of claim 14, wherein updating the user record includes removing a compromised password hash field and a hash function field.

16. The computer program product of claim 9, wherein the computer readable program when executed on the computer causes the computer to also:
generate a hash value as the actual password hash using the password and a hash function for a profile server; and
generate a hash value as the compromised password hash using the password and a compromised hash function from a user record, the compromised hash function for generating the compromised password hash being retrieved from a third party.

17. A system comprising:
a hardware processor;
a memory storing instructions that, when executed by the hardware processor, cause the system to:
receive, at a login time, a login request including a login identifier and a password;
retrieve a retrieved actual password hash and a retrieved compromised password hash corresponding to the login identifier, the retrieved compromised password hash is a hash of a potentially compromised password;
retrieve an actual password hash function and a compromised password hash function;
generate a generated actual password hash by applying the actual password hash function to the password and a generated compromised password hash by applying the compromised password hash function to the password, the generated actual password hash being different from the generated compromised password hash;
compare, at the login time and responsive to the login request, the retrieved actual password hash to the generated actual password hash;
compare, at the login time and responsive to the login request, the retrieved compromised hash to the generated compromised password hash;
deny access if both the retrieved actual password hash matches the generated actual password hash and the retrieved compromised hash matches the generated compromised password hash; and
grant access if the retrieved actual password hash matches the generated actual password hash and the retrieved compromised hash does not match the generated compromised password hash.

18. The system of claim 17 wherein a user database also stores a hash function corresponding to the compromised password hash, the hash function being retrieved from a third party and being used to generate the compromised password hash.

19. The system of claim 17 further comprising a compromised password collection module for gathering compromised login names, compromised password hashes and hash functions, the compromised password collection module coupled to a compromised password storage module to provide the compromised login names, compromised password hashes and hash functions for storage in a user database.

20. The system of claim 17 further comprising a compromised password storage module for storing compromised login names, compromised password hashes and hash functions in a user database, the compromised password storing module coupled to a compromised password collection module to receive the compromised login names, compromised password hashes and hash functions, and coupled to the user database to store them in the user database.

21. The system of claim 20 wherein the compromised password storage module stores a particular compromised password hash and corresponding hash function in a plurality of user records in the user database, a particular compromised login name partially matches login names of the plurality of user records in the user database.

22. The system of claim 17 wherein the compromised password hash and the actual password hash corresponding to a selected login are stored in a same user record in a user database as the selected login.

23. The system of claim 17, wherein the memory further storing instructions that, when executed by the hardware processor, cause the system to take protective action if both the retrieved actual password hash matches the generated actual password hash and the retrieved compromised hash matches the generated compromised password hash, the protective action is one from the group of a user challenge, a secondary authentication and other authentication steps.

24. The system of claim 17, wherein the memory further storing instructions that, when executed by the hardware processor, cause the system to take protective action if both the retrieved actual password hash matches the generated actual password hash and the retrieved compromised hash matches the generated compromised password hash, the protective action is one from the group of resetting a password for a user account, temporarily disabling the user account and permanently disabling the user account.

25. The system of claim 17 wherein a login module also updates a user record in a user database by removing a compromised password hash field and a hash function field if access is granted.

* * * * *